US009004003B2

(12) United States Patent
Hart et al.

(10) Patent No.: US 9,004,003 B2
(45) Date of Patent: Apr. 14, 2015

(54) APPARATUS FOR APPLYING AN ACOUSTIC DAMPENING COATING TO THE INTERIOR OF A XEROGRAPHIC DRUM

(75) Inventors: Steven C. Hart, Webster, NY (US); Fa-Gung Fan, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1425 days.

(21) Appl. No.: 12/491,498

(22) Filed: Jun. 25, 2009

(65) Prior Publication Data

US 2010/0326352 A1 Dec. 30, 2010

(51) Int. Cl.

| | |
|---|---|
| ***B05B 13/06*** | (2006.01) |
| ***B05C 5/00*** | (2006.01) |
| ***B08B 9/04*** | (2006.01) |
| ***B05B 3/02*** | (2006.01) |
| ***B05C 7/08*** | (2006.01) |
| ***B05D 7/22*** | (2006.01) |
| ***G03G 15/00*** | (2006.01) |
| *B05D 5/12* | (2006.01) |
| *F16L 55/18* | (2006.01) |
| *B05B 12/14* | (2006.01) |

(52) U.S. Cl.

CPC ................ *B05C 7/08* (2013.01); *B05B 12/1481* (2013.01); *B05D 7/222* (2013.01); *B05D 2254/04* (2013.01); *B05B 13/06* (2013.01); *G03G 15/751* (2013.01); *Y10S 118/03* (2013.01); *Y10S 118/10* (2013.01)

(58) Field of Classification Search

CPC ........ B05C 7/08; B05C 5/0216; B05D 1/265; B05D 1/42; B05D 7/222; B05D 2254/04; B05B 13/0627; B05B 12/1481; G03G 15/751; B08B 9/0557; F16L 58/1009; Y10S 118/03; Y10S 118/04; Y10S 118/10; Y10S 118/13

USPC ........... 118/306, 317, DIG. 10, 254; 239/165, 239/406; 427/28

See application file for complete search history.

(56) References Cited

U.S. PATENT DOCUMENTS

| | | | | |
|---|---|---|---|---|
| 2,520,397 | A * | 8/1950 | Green | 118/306 |
| 3,056,156 | A * | 10/1962 | Immel | 15/104.061 |
| 3,141,584 | A * | 7/1964 | Wing | 222/309 |
| 3,333,311 | A * | 8/1967 | Matheny et al. | 425/262 |
| 3,643,727 | A * | 2/1972 | Longoni et al. | 164/465 |
| 3,719,168 | A * | 3/1973 | Kazee | 118/306 |
| 3,941,087 | A * | 3/1976 | Yazaki | 118/306 |
| 4,058,258 | A * | 11/1977 | Rosen et al. | 239/165 |
| 4,069,535 | A * | 1/1978 | Cato | 15/104.061 |
| 4,158,071 | A * | 6/1979 | Jordan et al. | 427/476 |
| 4,273,605 | A * | 6/1981 | Ross | 156/286 |
| 4,335,677 | A * | 6/1982 | Nagata et al. | 118/DIG. 10 |
| 4,368,219 | A * | 1/1983 | Nagata et al. | 427/236 |
| 4,381,078 | A * | 4/1983 | Vessels | 239/118 |
| 4,497,442 | A * | 2/1985 | Williams | 239/437 |
| 4,499,118 | A * | 2/1985 | Dietz et al. | 427/476 |

(Continued)

*Primary Examiner* — Dah-Wei D Yuan
*Assistant Examiner* — Karl Kurple
(74) *Attorney, Agent, or Firm* — Ronald E. Prass, Jr.; Prass LLP

(57) ABSTRACT

This is a photoconductor and dispenser assembly and system. The photoconductor is in a tubular form so as to accept a tubular formed dispenser within its hollow portion. The dispenser will coat within this hollow portion a uniform coating of an acoustical dampening material. This material will dull any sound produced by the photoconductive marking system. The assembly is the tube having in its hollow portion this dispenser. The dispenser fits tightly but movably within the hollow portion.

17 Claims, 2 Drawing Sheets

(56) References Cited

U.S. PATENT DOCUMENTS

| | | | | |
|---|---|---|---|---|
| 4,714,589 | A * | 12/1987 | Auwerda et al. | 427/573 |
| 4,741,795 | A * | 5/1988 | Grace et al. | 156/247 |
| 4,759,946 | A * | 7/1988 | Ribnitz | 427/8 |
| 4,780,072 | A * | 10/1988 | Burnette | 425/62 |
| 5,230,842 | A * | 7/1993 | Munde | 264/34 |
| 5,309,947 | A * | 5/1994 | Hinger | 138/98 |
| 5,326,400 | A * | 7/1994 | Sagawa | 118/105 |
| 5,497,807 | A * | 3/1996 | Rogers | 138/98 |
| 5,505,992 | A * | 4/1996 | Ferralli | 427/236 |
| 5,531,383 | A * | 7/1996 | Pacht | 239/251 |
| 5,607,364 | A * | 3/1997 | Hedrick et al. | 473/318 |
| 5,658,613 | A * | 8/1997 | Ferralli | 427/236 |
| 5,662,964 | A * | 9/1997 | Zecchin | 427/232 |
| 5,706,598 | A * | 1/1998 | Johnston | 42/51 |
| 5,722,016 | A * | 2/1998 | Godlove et al. | 399/159 |
| 5,861,191 | A * | 1/1999 | Ferralli | 427/316 |
| 5,894,042 | A * | 4/1999 | Ferralli | 428/36.91 |
| 6,176,927 | B1 * | 1/2001 | Nussbaumer et al. | 118/317 |
| 6,208,821 | B1 * | 3/2001 | Grune et al. | 399/159 |
| 6,263,534 | B1 * | 7/2001 | McCann et al. | 15/3.5 |
| 6,461,456 | B1 * | 10/2002 | Kurokawa et al. | 156/64 |
| 6,614,463 | B2 * | 9/2003 | Kerr et al. | 347/241 |
| 7,270,847 | B2 * | 9/2007 | Horn | 427/230 |
| 7,717,056 | B2 * | 5/2010 | Horn | 118/215 |
| 7,726,256 | B1 * | 6/2010 | Weisenberg | 118/323 |
| 7,769,323 | B2 * | 8/2010 | Hart et al. | 399/159 |
| 7,896,266 | B1 * | 3/2011 | Cooper et al. | 239/754 |
| 8,061,296 | B1 * | 11/2011 | Batur | 118/318 |
| 8,402,911 | B1 * | 3/2013 | Weisenberg | 118/306 |
| 8,474,395 | B2 * | 7/2013 | Meredith et al. | 118/254 |
| 2002/0040752 | A1 * | 4/2002 | Kurokawa et al. | 156/64 |
| 2003/0136745 | A1 * | 7/2003 | DeAngelis | 210/748 |
| 2005/0081899 | A1 * | 4/2005 | Shannon | 134/172 |
| 2005/0098654 | A1 * | 5/2005 | Reetz, III | 239/296 |
| 2006/0060135 | A1 * | 3/2006 | Rankin et al. | 118/412 |
| 2006/0068095 | A1 * | 3/2006 | Nishi et al. | 427/240 |
| 2008/0094428 | A1 * | 4/2008 | Otis et al. | 347/1 |
| 2008/0199216 | A1 | 8/2008 | Hart et al. | |
| 2008/0233293 | A1 * | 9/2008 | Borgne et al. | 427/348 |
| 2010/0189895 | A1 * | 7/2010 | Arndt et al. | 427/231 |
| 2011/0076397 | A1 * | 3/2011 | Rauch | 427/230 |
| 2012/0141672 | A1 * | 6/2012 | Setoguchi et al. | 427/236 |
| 2012/0177809 | A1 * | 7/2012 | Solie et al. | 427/8 |
| 2013/0269812 | A1 * | 10/2013 | Redmond et al. | 137/899 |

* cited by examiner

APPARATUS FOR APPLYING AN ACOUSTIC DAMPENING COATING TO THE INTERIOR OF A XEROGRAPHIC DRUM

This invention relates to an electrophotographic system and more specifically to a Xerographic drum used in said system.

BACKGROUND

While the present invention of a coating apparatus can be effectively used in a plurality of different tube coating uses, it will be described for clarity as used in a tube or photoconductive drum used in a Xerographic system.

By way of background, in marking systems such as xerography or other electrostatographic processes, a uniform electrostatic charge is placed upon a photoreceptor belt or drum surface. The charged surface is then exposed to a light image of an original to selectively dissipate the charge to form a latent electrostatic image of the original. The latent image is developed by depositing finely divided and charged particles of toner upon the drum photoreceptor surface. The toner may be in dry powder form or suspended in a liquid carrier. The charged toner, being electrostatically attached to the latent electrostatic image areas, creates a visible replica of the original. The developed image is then usually transferred from the photoreceptor surface to an intermediate transfer belt or to a final support material, such as paper.

In some of these electrostatic marking systems, a photoreceptor belt or drum surface and an intermediate transfer belt (ITB) are generally arranged to move in an endless path through the various processing stations of the xerographic marking process. In this endless path, several xerographic-related stations are used having a plurality of photoconductive drums which become abraded and worn partly because of contact with their components in the system, such as belt configurations, such as transfer belts, pre-fuser belts, cleaning blades or belts and the like. Each of these drums is constantly exposed to friction, especially in high speed systems, the drum needs to be frequently replaced. Also, since the photoreceptor drum is reusable once the toner image is transferred, the surfaces of these belts are constantly abraded and cleaned by a blade and/or brushes and prepared to be used once again in the marking process. In U.S. Patent publication U.S. 2008/0199216 (incorporated by reference herein) a problem in drum xerographic usage is noted, i.e. "When electrostatographic drums are cleaned by doctor type cleaning blades rubbing against the imaging surface to remove residual toner particles remaining on the imaging surface after toner image transfer to a receiving member, a high pitched ringing, squealing, squeaking, or howling sound can be created which is so intense that it is sometimes intolerable for machine operators. This is especially noted in drum type imaging members comprising a hollow cylindrical substrate.

Under normal operation in a printer/copier, a drum photoreceptor can emit a noticeable and objectionable sound. The cause of this noise can be due either to the cleaning or charging mechanisms. If a BCR (bias charging roll) is utilized to charge the photoreceptor, the AC voltage applied between the BCR and a photoreceptor can produce a "forced" mechanical vibration at the AC frequency. Alternatively, slip-stick motion of the cleaning blade against the photoreceptor surface can drive a mechanical resonance at the slip-stick frequency. There are several known methods to combat this problem, each with its own disadvantages.

A. One can simply make the P/R tube wall thicker. This stiffens the tube which in turn reduces the amplitude of the vibrations/sound. Additionally, the added mass changes the natural resonant frequency of the tube. The down side is that the added wall thickness uses more aluminum and costs more.

B. One can insert "silencers" into the interior of the P/R tube to dampen the mechanical vibration and reduce the amplitude of the noise. See for example, U.S. Pat. No. 5,722,016"Electrostatographic Imaging Member Assembly". This is what we, Xerox, currently do with the 30 mm diameter P/R tubes for the Imari Family of machines. This approach costs more than $1.05 per P/R for the assemblies used in the Workcentre Pro 32 and related products.

C. One can coat the interior of the P/R tube with an appropriate acoustic dampening compound such as a silicone rubber, latex caulk, soft UV curable rubber, etc. This concept has been successfully demonstrated. It functions equivalent to or better than (up to a total of 3) inserted "silencers" in recent testing. Furthermore, this approach does have the potential to be significantly lower cost than prior methods. For further discussion of this approach, refer to earlier noted U.S. Publication No. 2008/0199216A1 "Method for Acoustic Dampening of Photoreceptor Drums".

The application of such a compound to the interior of the P/R tube does pose some challenges both in how to apply the coating and where/when in the manufacturing process is the coating applied. Initial thoughts were to use a process similar to flow coating, but on the interior of the P/R tube wherein the P/R tube would be rotated and a continuous touching spiral of material would be applied. However, after consideration of that concept it was believed that process would take too long and would not be compatible with the current 9 second cycle time for each station on the existing P/R production facility. This invention addresses the important concern—How to apply an acoustic dampening compound to the interior of a photoreceptor tube in a time period commensurate with a total cycle time of under 9 seconds.

Internal "Silencers" have been utilized in photoreceptor P/R tubes or drums to quench noise for quite a while; there are numerous patents related to the concept. Recently, the manually internally applied acoustic dampening coating was disclosed; see Xerox earlier noted Patent Publication 2008/0199216A1—"Method for Acoustic Dampening of Photoreceptor Drums" by Steven C. Hart & Patricia Campbell (now a pending U.S. patent application). Initial examples were created in this publication using a caulk gun and spatula to apply the coating to the tubular interior of large (84 mm) diameter photoreceptors. Hand application via a spatula is not feasible as a large scale manufacturing technique; additionally, it is difficult, if not impossible, to do inside a smaller 30 mm diameter photoreceptor. Subsequently, a crude apparatus was fabricated and used to hand coat the interior of 30 mm diameter photoreceptors. Machine testing of these samples indicated that the (un-optimized) internally applied acoustic dampening coating performed equal to or slightly better than the old style non-coated "silencers." Additionally, it is desirable to provide an assembly to accomplish the coating operation within a total cycle time of under 9 seconds so as not to slow down the P/R production line.

SUMMARY

This invention provides a coating dispensing assembly that can uniformly coat the interior of a photoreceptor (PR) drum or tube with a high viscosity acoustic dampening compound such as silicone rubber (RTV, HTV, or UV cure), or latex caulk, or other suitable compound in a single axial stroke. The dispense head, mounted on a rigid central pipe, is tightly movably inserted into a photoreceptor tube or drum. By "tightly" is meant where the dispenser abuts the inner tube surface without any substantial space therebetween. As the dispense head is being removed (at a controlled, but not necessarily constant velocity), the coating compound is pumped down the central pipe, through the dispense head, and applied as a uniform layer on the order of about 1 mm thick to the interior surface of the photoreceptor tube (the thickness depends upon the size of the PR tube). The internal geometry of the dispense head is designed such that the highest internal impendence occurs just as the compound exit point from the head; this ensures that the coating will be circumferentially uniform around the interior of the photoreceptor tube. Fluid flow modeling of this design suggests that coating cycle times on the order of 5 seconds can be achieved for a 1 mm thick by 370 mm long coating on the inside of a 30 mm diameter photoreceptor tube.

The invention includes a PR and dispenser assembly that comprises this dispenser positioned in the PR tube or drum with a material inlet at its rear portion and a material outlet at its front portion. The dispenser is configured to be removed from the PR once the coating process is completed.

DETAILED DISCUSSION OF DRAWINGS AND PREFERRED EMBODIMENTS

Figure 1:
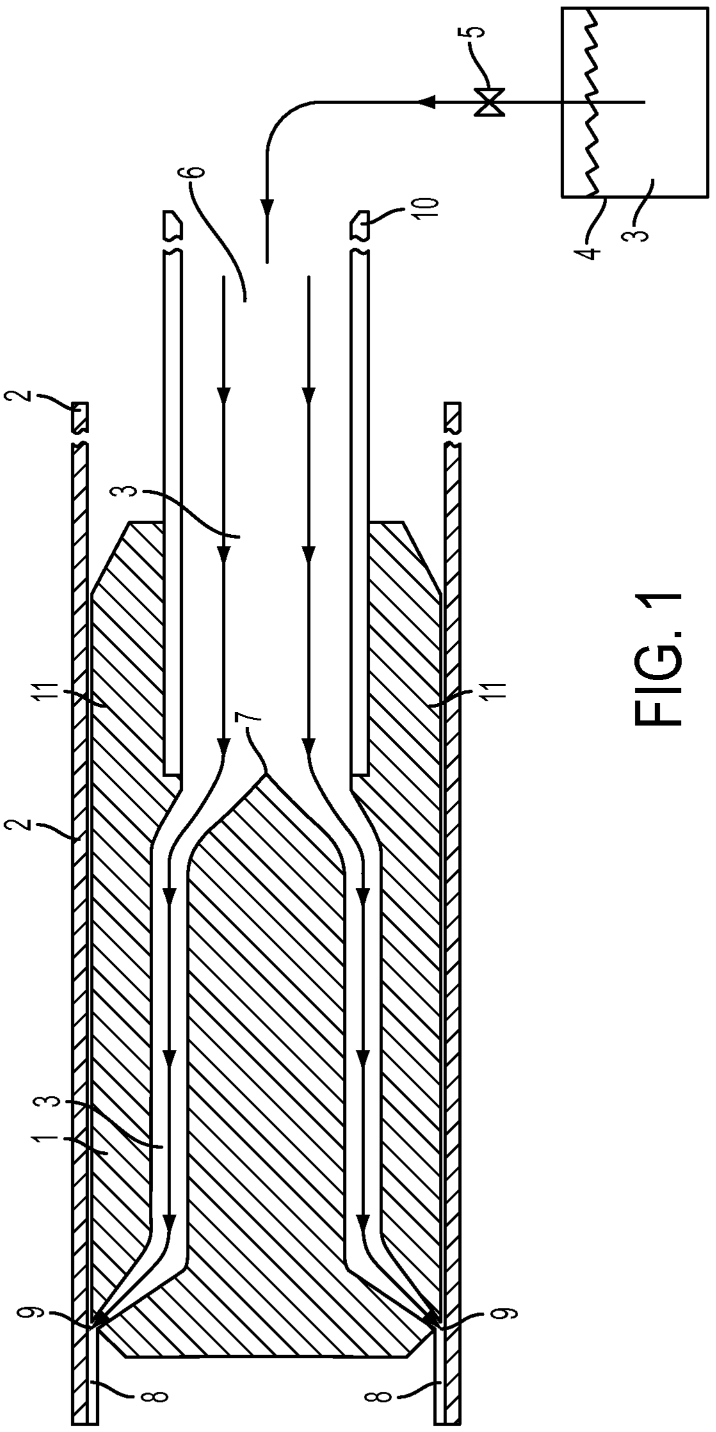
FIG. 1 illustrates an embodiment of the PR and dispenser assembly of this invention as it is being used to coat the interior of the photoreceptor (PR) tube or drum.

An idealized cross section of the dispense head inside of a photoreceptor tube of the PR and dispenser assembly is illustrated in FIG. 1.

Figure 2:
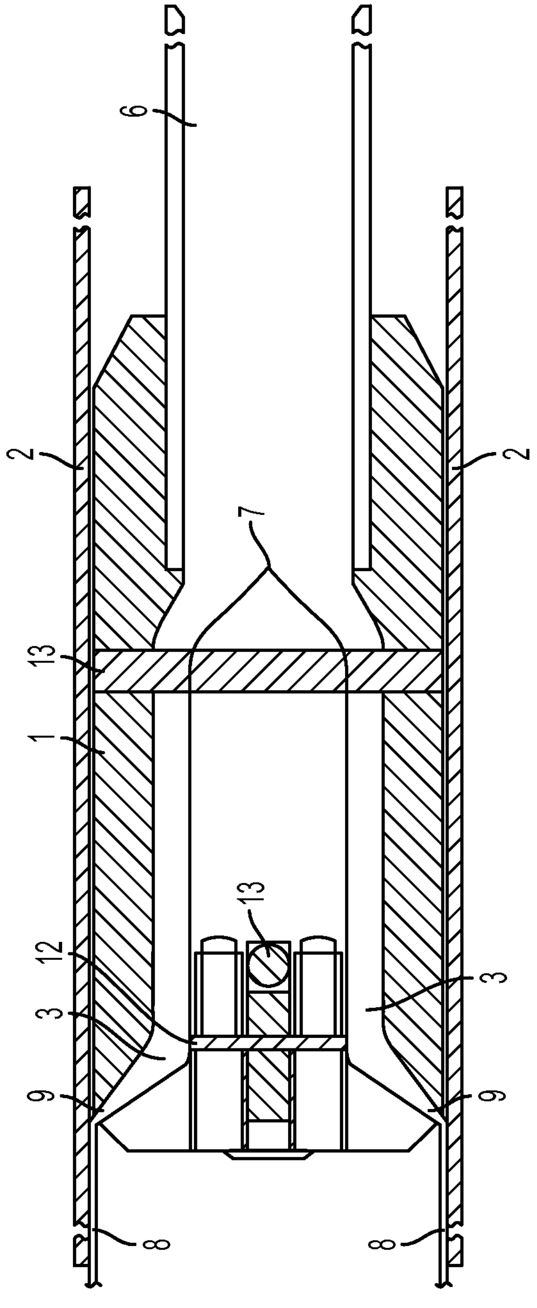
FIG. 2 illustrates a more detailed embodiment showing components used in the PR and dispenser assembly of this invention.

In FIG. 1, a cross section of the dispensing head 1 illustrates an ideal interior assembly configuration and acoustic dampening material 3 flow path. Note, the dispense head 1 is cylindrically symmetric. For clarity this view omits a) the support pins needed to maintain the central core in the center of the dispense head and b) provisions for adjusting the dimensions of the exit gap 9 where the acoustic dampening material 3 leaves the dispense head 1 and c) the acoustic dampening material 3 being applied to (actually extruded onto), the interior of the photoreceptor tube 2 as the dispense head 1 is being withdrawn from inside the tube or PR-2. These omissions are shown in FIG. 2.

In order to apply a (uniform) layer of material 8 to the interior of the photoreceptor tube 2, the dispense head 1 is inserted into the PR tube 2 such that the dispensing point is in one embodiment on the order of 20 mm from the end of the PR tube. Of course, this distance will vary depending upon the size of the tube 2. Next, a "spool" valve 5 is activated (opened). This allows the acoustic dampening compound 3 to be pumped down the central support pipe, through the dispense head 1 and to be extruded onto the interior of the tube 2. Simultaneously, the assembly 1 is withdrawn from the PR tube 2 at a controlled velocity, until the dispense point is on the order of 20 mm from the other end of the PR tube 2. At this time/point, the "spool" valve 5 is deactivated (closed) as the dispense head 1 continues to be extracted from the inside of the tube. "Spool" valves 5 have by design a "suck back" of the material being applied; this results in a "clean" break of the material flow and a well-defined edge to the applied material 3.

Assume that the pressure used to pump the compound into the dispense head 1 is constant, i.e. the flow rate is constant. Then the coating 8 thickness should be approximately inversely linear with the extraction velocity. Thus, if a uniform coating 8 thickness is desired, the extraction velocity will be constant. On the other hand, if one desires a coating thickness that is thicker in the center of the tube than at the ends, then the extraction velocity will be lower in the central region of the tube than the ends.

It is highly desirable to ensure that the layer of material coating 8 is circumferentially uniform. By "circumferentially uniform" is meant a uniformity around a point on the circumference of the inner surface of the PR. Failure to do so could lead to a rotational imbalance that could in turn cause motion quality defects in any image. Furthermore, a circumferentially uniform layer 8 should provide the most efficient acoustic dampening for any given quantity of dampening material 3.

In order to achieve a circumferentially uniform layer 8, it is important that the compound 3 is extruded out of the dispense head 1 in a uniform fashion all the way a round the head 1. To achieve this, the highest flow impedance should occur just at the exit gap 9 where the material 3 leaves the dispense head 1. This is accomplished by appropriate design of the material flow channel. The cross sectional area of the channel perpendicular to the flow stream should smoothly and continuously decrease as the material 3 moves out from the central support pipe 10 to the dispensing point 9 having the smallest area at the dispense point 9.

Several different flow channel geometries can be used, if suitable. If one were to attempt to utilize a design similar to that shown in FIG. 1 depending on material viscosity and surface tension, the flow could easily develop regions on the periphery where uniform material was being delivered.

In FIG. 1 the dispenser 1 is shown inserted into the P.R. tube or drum 2 to form a PR and dispenser assembly, and the coating material 3 is pumped into the flow path (indicated by arrows) from material source 4. A spool valve 5 is used to activate or close the flow of material 3 into the material flow path 6. The material 3 exits the dispenser 1 from adjustable exit gap 9 to form uniform material coating 8. A material flow channel is formed between central core 7 and the exterior portions 11 of the dispenser 1.

FIG. 2 illustrates an embodiment of an actual preferred dispense head 1 design. This design has the same internal geometry as the idealized design used for the modeling work and shown in FIG. 1 with two exceptions. A) provisions have been in FIG. 2 added to adjust the width of the exit ring gap 9 by changing the thickness of the spacer shim washers 12. The spacer washers 12 will not obstruct the compound flow through the dispense head 1 into tube 2. B) two cross pins 13 have been added to support the central core. The supporting cross pins 13 are far enough upstream in the material flow path 6 that any perturbations to the material 3 flow will have been damped out before the compound 3 reaches the exit point 9.

In summary, embodiments of the present invention provide: a photoconductor (PR) and dispenser assembly comprising: a PR having a tubular form with an outer photoconductor's surface and a hollow inner portion. The dispenser is configured to tightly slide into the PR inner tubular surface. The dispenser has a rear end portion being a material inlet and having at a front end portion an acoustical dampening material outlet. This material outlet is configured to apply a substantially circumferentially uniform coating of this sound or acoustic dampening material to the PR inner surface. The dispenser is configured to be totally removable from the hollow inner portion of the PR after the coating of a sound dampening material is completed.

The rear end portion of the dispenser is in flow connection to a source of the acoustic dampening material. The front end portion of the dispenser comprises an outlet gap, this outlet gap is in flow relationship to a material conduit that extends through the dispenser from the rear end portion to the front end portion.

Specifically, an embodiment of the dispenser comprises a tubular-shaped housing having a central core in an interior portion and a material flow path extending around said core. The flow path extends through substantially an entire length of the housing.

One end of the housing comprises a coating material inlet opening, and an opposite end of the housing comprises a coating material dispensing section with a material dispensing gap.

The material inlet opening is configured to receive the acoustic dampening coating material, this material dispensing section is configured to apply an acoustic dampening material as a uniform coating in an inside portion of the drum. A source of said acoustic dampening material is in flow connection with the coating material inlet opening. This source has a connecting valve which is configured to turn a material flow on and turn off to said inlet opening.

The housing has a central core, an exterior portion surrounding the central core, between the exterior portion and said central core is a material flow path that is configured to transport the material from the inlet opening to a material exit gap. The housing has a material exit gap in the material dispensing section, this gap is configured to be adjustable to provide for coatings of various thicknesses.

In one preferred embodiment the adjuster is an adjustable or removable washer, both configured to adjust the gap. The dispenser also has at least one dowel pin to support the central core of the dispenser.

In one other preferred embodiment the dispenser is configured to accept a different size spacer washer, the washer is configured to adjust a width of the exit gap and the spacer is also configured to not obstruct the material flow through said housing.

The invention also comprises dispenser system useful in coating an interior of a xerographic drum or tube, said dispenser comprising a tubular-shaped housing having a central core in an interior portion and a material flow path extending around said core. The flow path extends through substantially an entire length of the housing.

One end of the housing comprising a coating material inlet opening and an opposite end of the housing comprising a coating material dispensing section with a material dispensing gap. The inlet opening is in flow connection with a source of an acoustical dampening material.

It will be appreciated that variations of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A photoconductor and dispenser assembly comprising:

a photoconductor having a tubular form with an outer photoconductive surface and an inner surface facing a hollow inner portion of the photoconductor; and a dispenser configured to tightly slide into the hollow inner portion of the photoconductor, the dispenser having a rear end portion that is a material inlet and having, at a front end portion, a material outlet, the material outlet being configured as a ring gap around a circumference of the front end portion of the dispenser and positioned directly adjacent to the inner surface of the photoconductor to apply a substantially circumferentially uniform coating of a non-aspirated sound or acoustic dampening material that is extruded through the ring gap to the inner surface of the photoconductor, the material outlet including the ring gap being in flow relationship to a material conduit that extends through the dispenser from the rear end portion to the front end portion, a cross-sectional area of a portion of the material conduit perpendicular to a flow stream of the sound or acoustic dampening material continuously decreasing to a dispensing point where the sound or acoustic dampening material exits the material outlet, and the dispenser being configured to be totally removable from the hollow inner portion of the photoconductor after coating of the sound or acoustic dampening material is completed.

2. The assembly of claim 1, the rear end portion of the dispenser being in flow connection to a source of the sound or acoustic dampening material.

3. The assembly of claim 1, the dispenser further comprising:

a tubular shaped housing having a central core in an interior portion and a material flow path extending around the central core, the material flow path extending through substantially an entire length of the tubular shaped housing, one end of the tubular shaped housing comprising a coating material inlet opening, and an opposite end of the tubular shaped housing comprising a coating material dispensing section including the material outlet configured as the ring gap around the circumference of the coating material dispensing section, the material inlet opening being configured to receive the sound or acoustic dampening material, the material dispensing section configured to apply the sound or acoustic dampening material as a uniform coating to the inner surface of the photoconductor; and a source of the sound or acoustic dampening material being in flow connection with the material inlet opening.

4. The assembly of claim 3, the source has a having a connecting valve which is configured to turn on and turn off said a material flow to said the material inlet opening.

5. The assembly of claim 3, the tubular shaped housing having an exterior portion surrounding the central core, and, between the exterior portion and the central core is the material flow path is circumferential and configured to transport the sound or acoustic dampening material from the material inlet opening to the ring gap.

6. The assembly of claim 3, the ring gap being adjustable to provide for coatings of various thicknesses.

7. The assembly of claim 6, the coating material dispensing section including an internal washer configured to adjust the ring gap.

8. The assembly of claim 5, further comprising at least one dowel pin mounted transversely with regard to the central core to support and center the central core in the tubular shaped housing in a manner that does not interfere with the sound or acoustic dampening material flowing through the circumferential material flow path.

9. The assembly of claim 1, the front end portion being configured to accept a spacer washer, the spacer washer being configured to adjust a width of the ring gap and being further configured to not obstruct the material flow through the dispenser.

10. A coating dispenser system that coats an interior of a xerographic drum or tube, the coating dispenser comprising:

a tubular shaped housing having a central core in an interior portion and a material flow path extending around the central core, the material flow path extending through substantially an entire length of the tubular shaped housing, one end of the tubular shaped housing comprising a coating material inlet opening, and an opposite end of the tubular shaped housing comprising a coating material dispensing section with a material dispensing ring gap around an outer radial circumference of the coating material dispensing section, the material inlet opening being configured to receive an acoustic dampening coating material, the material dispensing section configured to apply the acoustic dampening coating material as a uniform coating that is extruded through the ring gap and onto an inside portion of the xerographic drum or tube, the ring gap being in flow relationship to a material conduit that extends through the tubular shaped housing from the coating material inlet opening, a cross-sectional area of a portion of the material conduit perpendicular to the material flow path continuously decreasing to a dispensing point where the material dispensing section as non-aspirated extruded material, and a source of the acoustic dampening coating material in flow connection with the coating material inlet opening.

11. The coating dispenser system of claim 10, the dispenser being configured with a cross section that causes at least the dispenser coating material dispensing section to fit movably and tightly into an interior portion of the xerographic drum or tube.

12. The coating dispenser system of claim 10, the source having a connecting valve configured to turn on and turn off flow of the acoustic dampening coating material to the coating material inlet opening.

13. The system of claim 10, the tubular shaped housing having an exterior portion surrounding the central core, and, between the exterior portion and the central core, the material flow path being circumferential and configured to transport the acoustic dampening coating material from the coating material inlet opening to the material dispensing ring gap.

14. The system of claim 10, the material dispensing ring gap being adjustable to provide coatings of various thicknesses.

15. The system of claim 14, further comprising a spacer washer in the coating material dispensing section configured to adjust the ring gap.

16. The system of claim 13, further comprising at least one dowel pin mounted transversely with regard to the central core to support and center the central core in the tubular shaped housing in a manner that does not interfere with the acoustic dampening coating material flowing through the circumferential material flow path.

17. The system of claim 10, the coating material dispensing section being configured to accept a spacer washer, the spacer washer being configured to adjust a width of the ring gap and being further configured to not obstruct flow of the acoustic dampening coating material through the tubular shaped housing.

* * * * *